(12) United States Patent
Tamezane et al.

(10) Patent No.: US 10,017,151 B2
(45) Date of Patent: Jul. 10, 2018

(54) STEERING LOCK DEVICE

(71) Applicant: KABUSHIKI KAISHA TOKAI RIKA DENKI SEISAKUSHO, Aichi (JP)

(72) Inventors: Takumi Tamezane, Aichi (JP); Tomoya Kato, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/607,532

(22) Filed: May 29, 2017

(65) Prior Publication Data

US 2017/0349140 A1    Dec. 7, 2017

(30) Foreign Application Priority Data

Jun. 2, 2016    (JP) .................................. 2016-111254

(51) Int. Cl.
*B60R 25/021*    (2013.01)
*B60R 25/20*     (2013.01)

(52) U.S. Cl.
CPC .. *B60R 25/02131* (2013.01); *B60R 25/02126* (2013.01); *B60R 25/02128* (2013.01); *B60R 25/2063* (2013.01); *B60R 25/021* (2013.01); *Y10T 70/5664* (2015.04); *Y10T 70/5956* (2015.04)

(58) Field of Classification Search
CPC ........ B60R 25/02131; B60R 25/02128; B60R 25/2063; B60R 25/02126; B60R 25/021; Y10T 70/5956; Y10T 70/5664; Y10T 70/5646

USPC ... 70/1.5, 1.7, 182–186, 252, 245–248, 417, 70/379 R, 379 A, 380, 422
See application file for complete search history.

(56) References Cited

U.S. PATENT DOCUMENTS 3,442,102 A * 5/1969 Butts ................. B60R 25/02126
                                                            70/1.5
4,143,528 A    3/1979 Weber et al.
(Continued)

FOREIGN PATENT DOCUMENTS

| JP | S58-180348 | 10/1983 |
| JP | 2007-125970 A | 5/2007 |
| JP | 2015-112987 A | 6/2015 |

OTHER PUBLICATIONS

Extended European Search Report dated Oct. 24, 2017 issued in European Patent Application No. 17173211.8.

*Primary Examiner* — Lloyd A Gall

(57) ABSTRACT

A steering lock device includes a camshaft including a shaft portion having an axis, a lock actuation cam that radially projects from a first position of the shaft portion in an axial direction, and a projection that radially projects from a second position of the shaft portion in the axial direction; a housing rotatably accommodating the camshaft; and a lock bar moved by the lock actuation cam in a locking direction or an unlocking direction when the camshaft is rotated about the axis when a key cylinder is operated by a mechanical key. When the lock bar locks the steering shaft, the camshaft is configured so that the projection is separated from the shaft portion if a load exceeding a predetermined strength acts on the projection of the camshaft. The predetermined strength rotates the lock actuation cam to disengage the lock bar from the steering shaft.

5 Claims, 5 Drawing Sheets

(56) References Cited

U.S. PATENT DOCUMENTS

| | | | | |
|---|---|---|---|---|
| 4,854,141 A * | 8/1989 | Haldric | ............ | B60R 25/02107 70/182 |
| 6,003,349 A * | 12/1999 | Nagae | ............... | B60R 25/02115 70/186 |
| 6,508,090 B1 * | 1/2003 | Hasegawa | ............... | B60R 25/02 477/99 |
| 6,880,374 B2 * | 4/2005 | Yukihara | ........... | B60R 25/02115 70/1.5 |
| 7,302,817 B2 * | 12/2007 | Ohtaki | ................... | B60R 25/04 70/186 |
| 2002/0148262 A1 | 10/2002 | Okuno | | |
| 2015/0158459 A1 | 6/2015 | Yoshida et al. | | |

* cited by examiner

STEERING LOCK DEVICE

CROSS-REFERENCE TO RELATED APPLICATIONS

This application is based upon and claims the benefit of priority from prior Japanese Patent Application No. 2016-111254, filed on Jun. 2, 2016, the entire contents of which are incorporated herein by reference.

BACKGROUND

The present invention relates to a steering lock device that disables a steering operation.

Japanese Laid-Open Patent Publication No. 2015-112987 describes a prior art steering lock device. The steering lock device includes a key cylinder, a camshaft, a lock stopper, and a lock bar. When the user rotates the key cylinder with a mechanical key, the camshaft is rotated about the axis of the camshaft. The rotation of the camshaft is transmitted by the lock stopper to the lock bar and moves the lock bar in a locking direction or an unlocking direction. The lock bar engages a steering wheel or a steering shaft to disable a steering operation. In this specification, a state in which the steering operation is disabled may be referred to as the locked state. A state in which the steering operation is enabled may be referred to as the unlocked state.

SUMMARY

The inventors of the present application have developed a structure that maintains a steering lock device in the locked state when one tampers with the steering lock device from outside the steering lock device.

It is an object of the present invention to provide a steering lock device that obviates unlocking of the steering lock device when tampered with from outside the steering lock device.

To achieve the above object, a steering lock device includes a camshaft, a housing, and a lock bar. The camshaft includes a shaft portion having an axis, a lock actuation cam that radially projects from a first position of the shaft portion in an axial direction, and a projection that radially projects from a second position of the shaft portion that differs from the first position in the axial direction. The camshaft is rotated about the axis when a key cylinder is operated by a mechanical key. The housing rotatably accommodates the camshaft. The lock bar is moved by the lock actuation cam in a locking direction or an unlocking direction when the camshaft is rotated. When the lock bar is moved in the locking direction, the lock bar engages a steering shaft to lock the steering shaft. When the lock bar is moved in the unlocking direction, the lock bar is disengaged from the steering shaft to unlock the steering shaft. When the lock bar locks the steering shaft, the camshaft is configured so that the projection is separated from the shaft portion if a load exceeding a predetermined strength acts on the projection of the camshaft. The predetermined strength rotates the lock actuation cam to disengage the lock bar from the steering shaft.

When the projection is exposed from the housing, a third party who is attempting unauthorized unlocking may attempt to rotate the lock actuation cam by applying a load to the projection to rotate the camshaft. In this regard, with the above structure, when a load exceeding the predetermined strength acts on the projection, the projection is separated before rotation of the lock actuation cam disengages the lock bar from the steering shaft. Thus, the load cannot be applied to the projection to rotate the camshaft. This obviates unauthorized unlocking. In this specification, the load exceeding the predetermined strength may be referred to as the large load.

In the steering lock device, the shaft portion and the projection of the camshaft are formed integrally with each other. The camshaft includes a low-strength portion located where the projection and the shaft portion are connected to each other.

With the above structure, when the large load acts on the projection, breakage occurs from the low-strength portion and the projection is separated from the shaft portion (camshaft). Thus, the projection is configured to be separated from the shaft portion without increasing the number of components.

In the steering lock device, the steering lock device is used with a vehicle shift lever that is shifted to a parking position and a non-parking position. The key cylinder is coupled to the housing. The housing includes an interlock attachment portion configured to attach a key interlock unit that prohibits removal of the mechanical key from the key cylinder unless the shift lever is shifted to the parking position. The projection includes a cam-shaped interlock cam that actuates the key interlock unit.

With the structure in which the housing includes the interlock attachment portion and the key interlock unit is coupled to the housing, there is a high probability that a third party who is attempting unauthorized unlocking does not tamper with the housing but tampers with the key interlock unit to expose the interlock cam from the housing. However, the interlock cam is configured to be separated from the shaft portion when the large load acts on the interlock cam. This obviates the tampering attempted on the key interlock unit from unauthorized unlocking. Thus, the resistance to tempering is improved.

In the steering lock device, the key interlock unit includes a synthetic resin case.

With the above structure, while the weight of the key interlock unit is reduced, the strength of the key interlock unit is decreased. This may adversely affect the resistance to tampering of a third party who is attempting unauthorized unlocking. However, the interlock cam is configured to be separated from the camshaft when a large load acts on the interlock cam. This improves the resistance to tampering.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a steering lock device will now be described.

Figure 1:
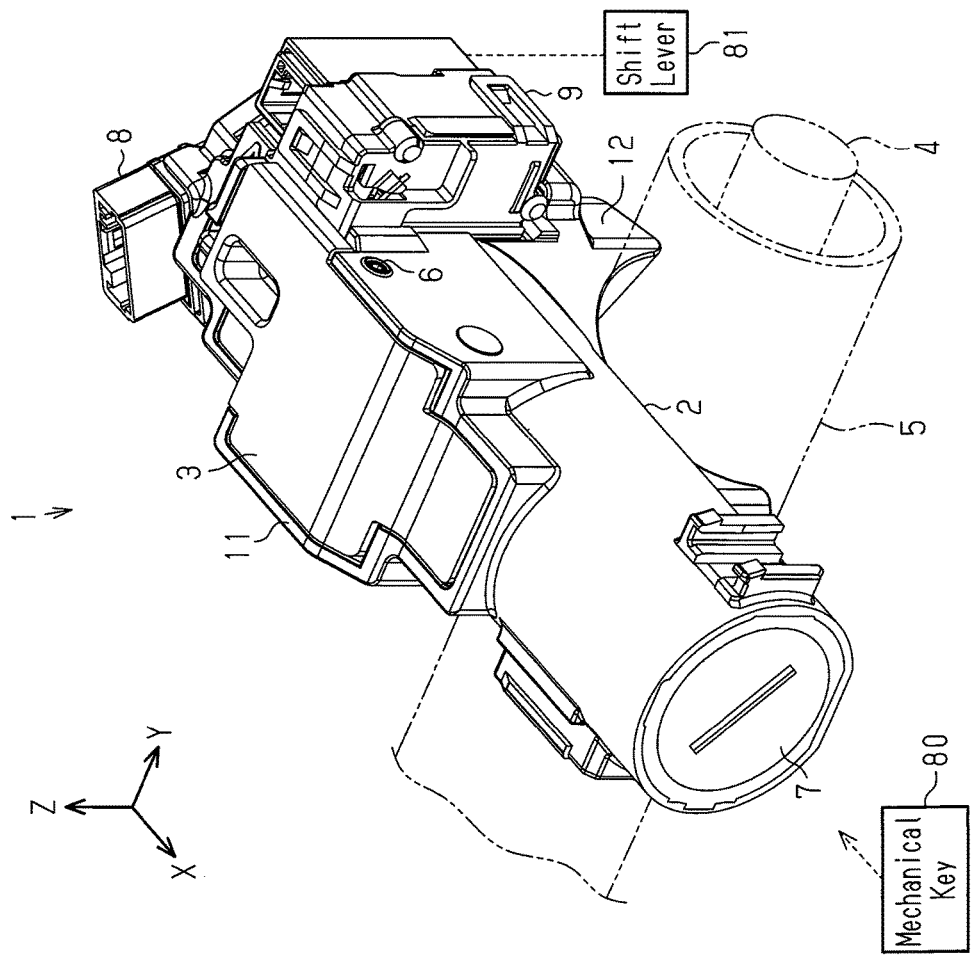
FIG. 1 is a perspective view of a steering lock device.

FIG. 1 illustrates an example of a steering lock device 1 that is configured to lock a steering wheel (not shown) to disable a steering operation of a vehicle. The steering lock device 1 includes a housing 2, which may be referred to as the lock body, and a cover 3. The housing 2 is formed from, for example, a magnesium alloy. The housing 2 includes a tubular portion, which has a longitudinal axis and two open ends, and a box-shaped portion 11, which has an opening in a side surface of the tubular portion. The housing 2 includes a support portion 12, which is opposite to the box-shaped portion 11. The support portion 12 may include a column support surface that is concaved in conformance with a convex outer surface of a steering column 5, which rotatably accommodates a steering shaft 4. The cover 3 is formed from, for example, a zinc alloy and is shaped to close the opening of the box-shaped portion 11. The cover 3 is fixed to the housing 2 by a plurality of press-fit pins 6. The steering lock device 1 is fitted to the steering column 5 by the support portion 12 of the housing 2 and fixed to the steering column 5 by a bracket (not shown).

Figure 3:
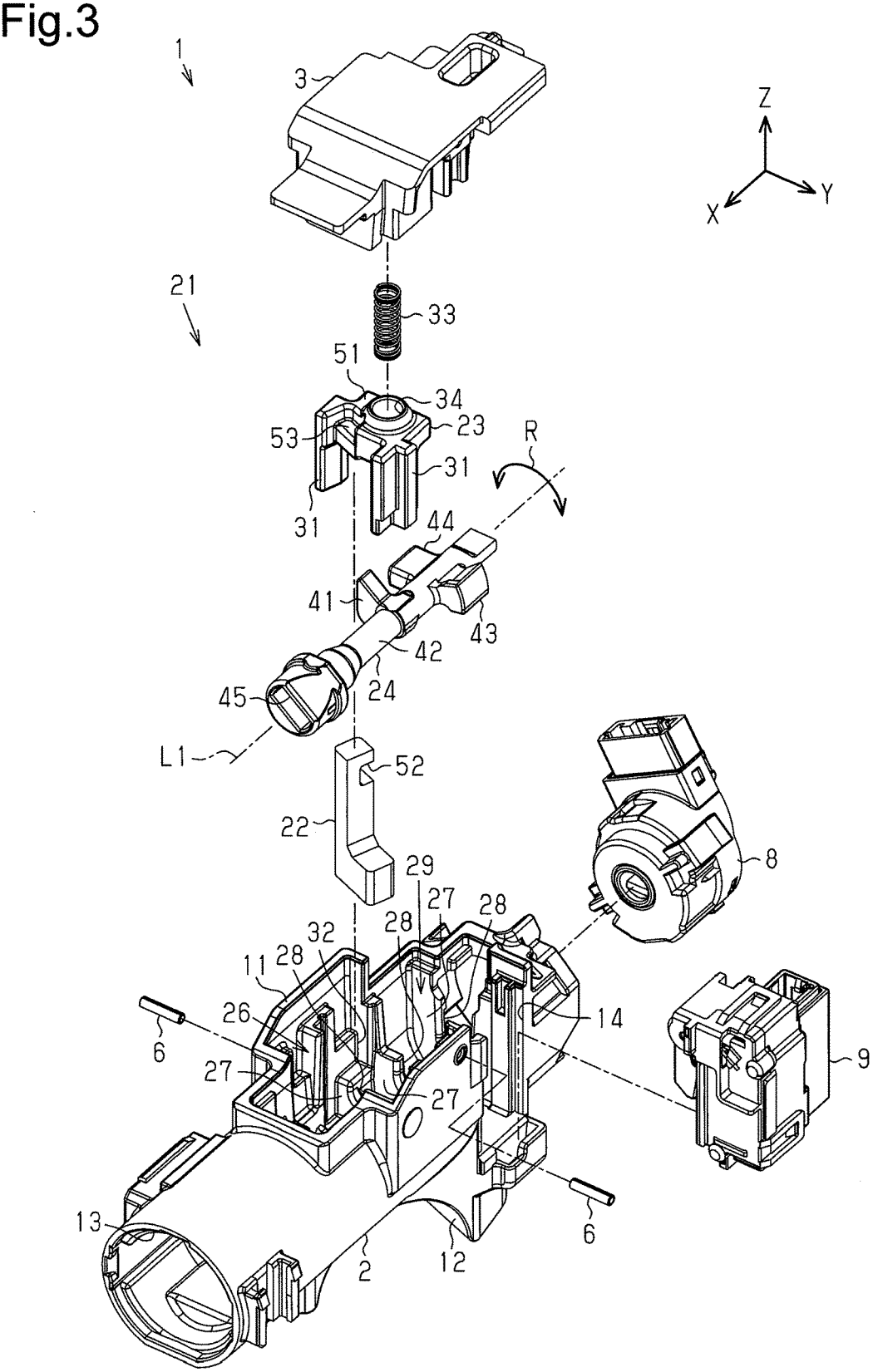
FIG. 3 is an exploded perspective view of the steering lock device.

As shown in FIGS. 1 and 3, the housing 2 includes an opening 13 that is located in one end in the longitudinal direction (X-axis direction). A key cylinder 7, which is inserted into the opening 13 and coupled to the housing 2, is operated by a mechanical key 80. An ignition switch 8, which is coupled to the other end of the housing 2 in the longitudinal direction, switches the power state (vehicle power state) in accordance with the operation position of the key cylinder 7. The housing 2 includes an interlock attachment portion 14, which opens in a side surface of the box-shaped portion 11 and serves as a portion to which a key interlock unit 9 is attached. The key interlock unit 9 performs a key interlock that disables removal of the mechanical key 80 from the key cylinder 7 unless a shift lever 81 is shifted to a parking position.

As shown in FIG. 3, the steering lock device 1 includes a lock mechanism 21 that locks and unlocks the steering operation by engaging with the steering shaft 4 and disengaging from the steering shaft 4. In the illustrated example, the lock mechanism 21 includes a lock bar 22, which engages the steering shaft 4 to lock the steering shaft 4, a lock stopper 23, which is coupled to the lock bar 22, and a camshaft 24, which is rotated when the mechanical key 80 operated in the key cylinder 7. The housing 2 includes a component receptacle 26 that accommodates the lock bar 22, the lock stopper 23, and the camshaft 24. A plurality (three in illustrated example) of support walls 27 is arranged in the component receptacle 26 next to one another in the longitudinal direction of the housing 2 to separate the empty space of the component receptacle 26. Each of the support walls 27 includes an arcuate groove 28, in which the camshaft 24 is rotatably located. Additionally, a portion of the component receptacle 26 defines an accommodation space 29 that accommodates at least a portion of the key interlock unit 9 in the interlock attachment portion 14.

The lock stopper 23 is plate-shaped and includes two side walls 31, which are spaced apart from each other in a width-wise direction (Y-axis direction) of the housing 2. The side walls 31 are partially inserted into two guides 32 (FIG. 3 shows only one) located in an inner wall surface of the housing 2. This couples the lock stopper 23 in a manner allowing for linear reciprocation of the lock stopper 23 along the guides 32. An urging member 33, which is, for example, a coil spring, is located between the cover 3 and the lock stopper 23 to urge the lock stopper 23 in a locking direction (negative side of Z-axis direction). The lock stopper 23 has a hole 34, which accommodates one end of the urging member 33. The other end of the urging member 33 is supported by an inner surface of the cover 3.

Figure 2:
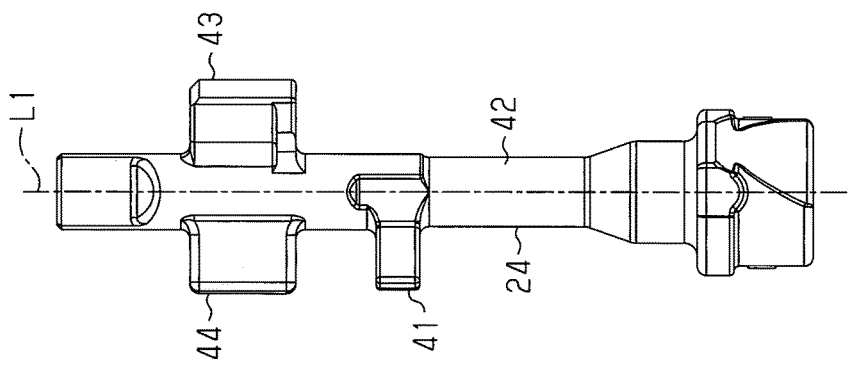
FIG. 2 is a side view of a camshaft.

As shown in FIGS. 2 and 3, the camshaft 24 includes a lock actuation cam 41, which has the form of a cam and actuates the lock stopper 23 in the locking direction or the unlocking direction. The lock actuation cam 41 radially projects from a shaft portion 42, which may be a rod-shaped portion of the camshaft 24. The camshaft 24 includes an interlock cam 43, which corresponds to a cam-shaped projection that actuates the key interlock unit 9. The interlock cam 43 radially projects from the shaft portion 42. The lock actuation cam 41 and the interlock cam 43 are located at different positions in an axial direction of the camshaft 24 and symmetrical about an axis L1 of the camshaft 24. The camshaft 24 includes a counterweight 44 that obtains the balance of the camshaft 24 in a direction extending about the axis L1 (direction indicated by arrow R in FIG. 3). The counterweight 44 radially projects from the shaft portion 42. The counterweight 44 and the interlock cam 43 are located at substantially the same position in the axial direction and symmetrical about the axis L1. The camshaft 24 has an end that is located at a side of the key cylinder 7 (positive side of X-axis direction) and has an elongated hole 45. The key cylinder 7 is coupled to the elongated hole 45.

Figure 4:
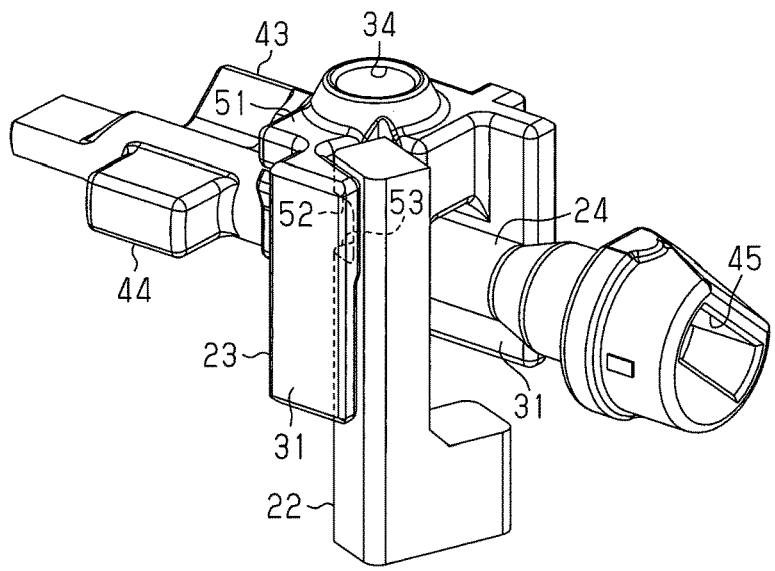
FIG. 4 is a perspective view of an assembly of a lock bar, a stopper, and the camshaft.

As shown in FIGS. 3, 4, and 6, when the steering lock device 1 is assembled, the camshaft 24 is rotatably located between the side walls 31 of the lock stopper 23. The lock stopper 23 includes a contact portion 51. The lock actuation cam 41 is in contact with the contact portion 51 from a side opposite to the urging member 33. The interlock cam 43 is directed to the interlock attachment portion 14, which is the opening located in the side surface of the housing 2. The lock actuation cam 41 is located at a position that differs from the position corresponding to the interlock attachment portion 14 in the axial direction of the camshaft 24.

As shown in FIGS. 3 and 4, the basal end of the lock bar 22, which has the form of a polygonal rod, includes a recess 52. The lock stopper 23 includes an engagement portion 53. Engagement of the engagement portion 53 with the recess 52 couples the lock bar 22 and the lock stopper 23 in a manner integrally movable in the locking direction and the unlocking direction. The housing 2 includes a hole 54 that opens in a curved surface of the support portion 12. When the steering lock device 1 is assembled, the distal end of lock bar 22 is arranged to be able to project out of the hole 54 and retract into the hole 54 (refer to FIG. 8).

Figure 5:
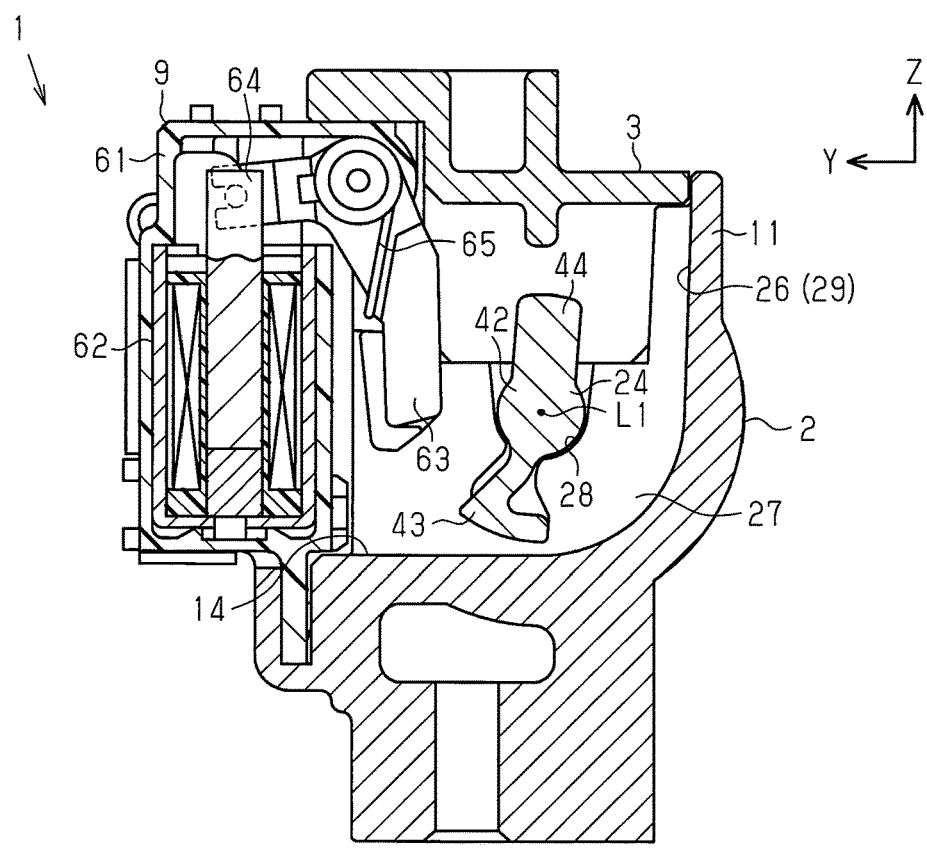
FIG. 5 is a cross-sectional view of the steering lock device showing a key interlock unit.

As shown in FIG. 5, the key interlock unit 9 includes a case 61, a solenoid 62 accommodated in the case 61, and a link 63 coupled to the solenoid 62. In the illustrated example, it is preferred that the case 61 and the link 63 be formed from a synthetic resin to reduce the weight. In some embodiments, the solenoid 62 may be a known self-sustaining solenoid. The key interlock unit 9 is attached to the interlock attachment portion 14 so that the link 63 is opposed to the interlock cam 43 in the width-wise direction (Y-axis direction) of the housing 2. The solenoid 62 includes a plunger 64, which is coupled to the basal end of the link 63. The link 63 is urged by a torsion spring 65 to be located in a region where the distal end of the link 63 interferes with the interlock cam 43. When the link 63 is moved against the urging force of the torsion spring 65 so that the plunger 64 projects, the distal end of the link 63 is allowed to move out of the region where the distal end of the link 63 interferes with the interlock cam 43.

Locking and unlocking of the steering operation performed by the steering lock device 1 will now be described.

Figure 6A:
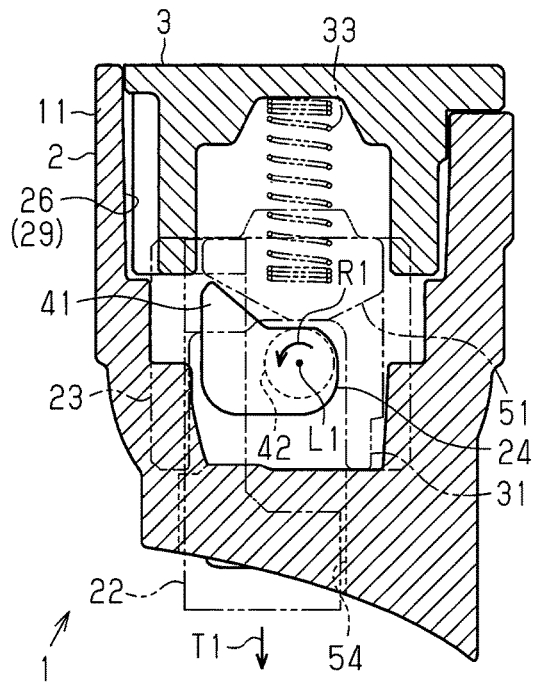
FIG. 6A is a diagram showing the locked state.

As shown in FIG. 6A, when the camshaft 24 is rotated in a locking direction (direction indicated by arrow R1 in FIG. 6A), for example, by movement of the key cylinder 7 to an IG OFF position, the urging force of the urging member 33 moves the lock bar 22 and the lock stopper 23 in a locking direction (direction indicated by arrow T1 in FIG. 6A). Consequently, the lock bar 22 projects out of the hole 54 of the housing 2 and engages the steering shaft 4 to disable rotation of the steering shaft 4. This sets the steering lock device 1 to the locked state.

Figure 6B:
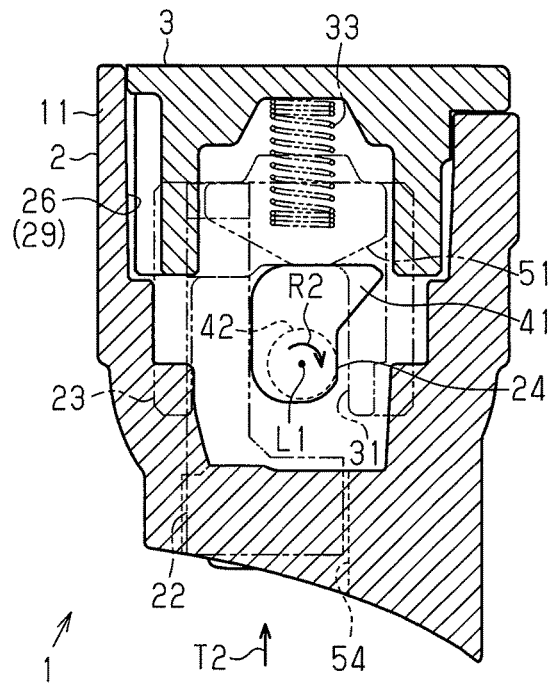
FIG. 6B is a diagram showing the unlocked state.

As shown in FIG. 6B, when the camshaft 24 is rotated in an unlocking direction (direction indicated by arrow P2 in FIG. 6B), for example, by movement of the key cylinder 7 to an ACC ON position or an IG ON position, the lock actuation cam 41 comes into contact with the contact portion 51 and pushes the lock stopper 23 toward the cover 3. This moves the lock bar 22 and the lock stopper 23 against the urging force of the urging member 33 in an unlocking direction (direction indicated by arrow T2 in FIG. 6B). Consequently, the lock bar 22 is retracted into the housing 2 and disengaged from the steering shaft 4. This sets the steering lock device 1 to the unlocked state.

The key interlock performed by the steering lock device 1 will now be described.

Figure 7A:
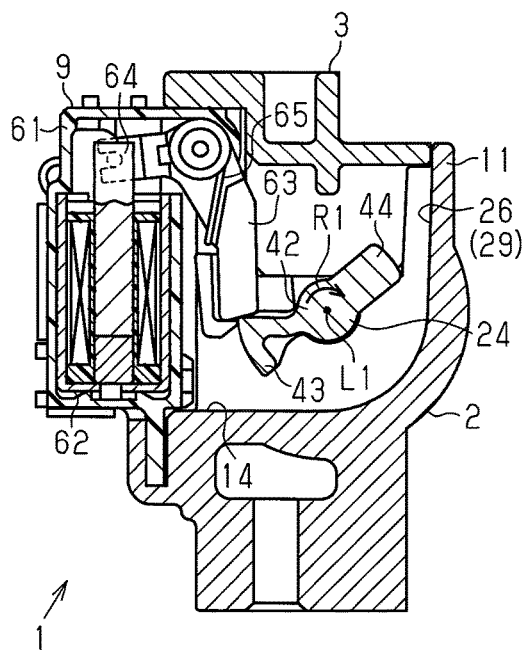
FIG. 7A is a diagram showing the locked state of the key interlock.

As shown in FIG. 7A, when the shift lever 81 is shifted to a position other than the parking position, the solenoid 62 is energized to restrict movement of the plunger 64, that is, movement of the link 63. In this state, if the driver attempts to move the key cylinder 7 from the ACC ON position to the IG OFF position, the interlock cam 43 comes into contact with the distal end of the link 63, the movement of which is restricted. This restricts further rotation. Therefore, when the shift lever 81 is not shifted to the parking position, the key cylinder 7 cannot be moved to the IG OFF position and the mechanical key 80 cannot be removed from the key cylinder 7.

Figure 7B:
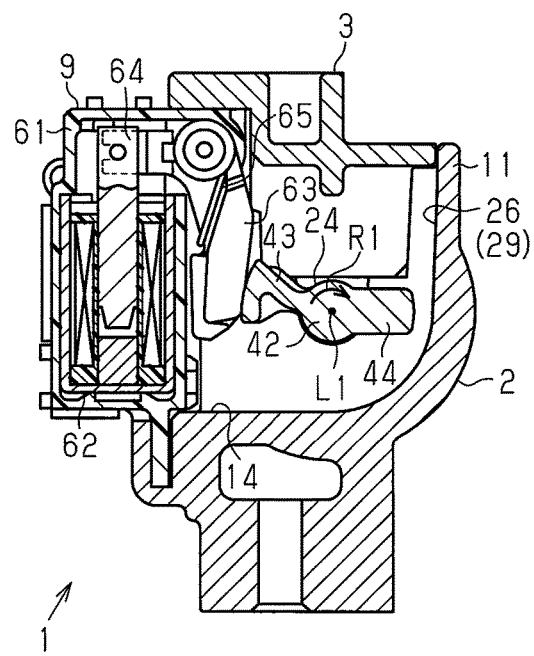
FIG. 7B is a diagram of the unlocked state of the key interlock.

As shown in FIG. 7B, when the shift lever 81 is shifted to the parking position, the energization of the solenoid 62 is stopped to allow for the movement of the plunger 64, that is, the movement of the link 63. In this state, if the driver tries moving the key cylinder 7 from the ACC ON position to the IG OFF position, the interlock cam 43 pushes down the link 63 against the urging force of the torsion spring 65 and the key cylinder 7 is rotated to the IG OFF position. Therefore, when the shift lever 81 is shifted to the parking position, the key cylinder 7 is movable to the IG OFF position and the mechanical key 80 is removable from the key cylinder 7.

If a third party tampers with the steering lock device 1 to switch the steering lock device 1 from the locked state to the unlocked state, the third party may break the key interlock unit 9 attached to the housing 2 with a tool or the like. In particular, when the key interlock unit 9 is formed from a synthetic resin, the key interlock unit 9 is more vulnerable to tampering than other components.

Figure 8:
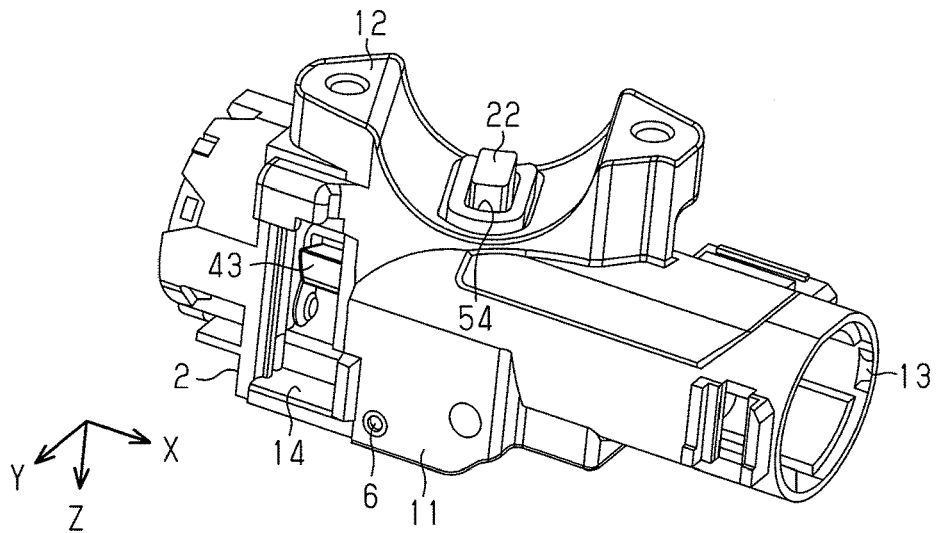
FIG. 8 is a perspective view of the steering lock device from which the key interlock unit is removed.

As shown in FIG. 8, when the key interlock unit 9 is removed, the interlock cam 43 is exposed from the interlock attachment portion 14 (housing 2). When the mechanical key 80 is removed in the locked state, rotation of the camshaft 24, which is connected to the key cylinder 7, is restricted. However, in order to rotate the camshaft 24 in the unlocking direction (R2 direction, refer to FIG. 6B), the third party may apply a load to the interlock cam 43 with a tool or the like to rotate the portion corresponding to the lock actuation cam 41, for example, by twisting the shaft portion 42 and plastically deforming the camshaft 24.

Figure 9:
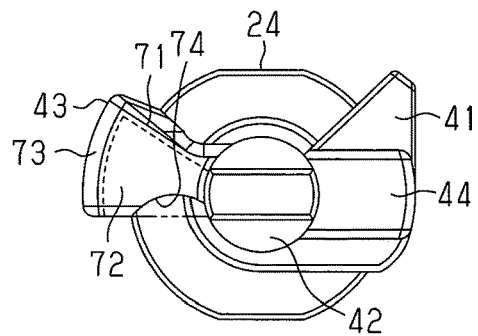
FIG. 9 is a front view of the camshaft.
Figure 10:
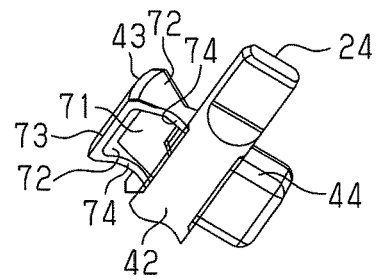
FIG. 10 is a partially perspective view of the camshaft showing an interlock cam.

In this regard, as shown in FIGS. 9 and 10, the camshaft 24 is configured so that the interlock cam 43 is separated from the shaft portion 42 if a load that exceeds predetermined strength acts on the interlock cam 43 in the locked state. In this specification, the load exceeding the predetermined strength may be a load that rotates the lock actuation cam 41 and disengages the lock bar 22 from the steering shaft 4.

More specifically, the interlock cam 43 includes a first wall 71, two second walls 72, and a third wall 73. The first wall 71 extends radially from the shaft portion 42 of the camshaft 24 and in the axial direction. The second walls 72 radially extend from the shaft portion 42 and are connected to two opposite ends of the first wall 71. The third wall 73 is connected to the distal end of each of the first wall 71 and the second walls 72. More specifically, the basal ends of the first wall 71 and the second walls 72 correspond to where the interlock cam 43 and the shaft portion 42 are connected to each other.

The first wall 71 is plate-shaped and bent in the locking direction of the camshaft 24 toward a radially outer side. Each of the second walls 72, the thickness of which extends in the circumferential direction, is sectoral so that the thickness is gradually reduced toward a radially inner side. The third wall 73 has the form of an arcuate plate that extends along the outer edge of each of the second walls 72.

The basal end of each of the second walls 72 is, for example, machined to be partially cut away defining a recess or a cutaway portion 74. To facilitate understanding, in FIG. 9, the double-dashed lines show wall surfaces of the second walls 72 before the cutaway portions 74 are formed. The cutaway portions 74 locally reduce the strength of the part connecting the interlock cam 43 with the shaft portion 42. When the load exceeding the predetermined strength acts on the interlock cam 43, the interlock cam 43 is separated from the shaft portion 42. The cutaway portions 74 each function as a low-strength portion.

The measured thickness of the cutaway portions 74, which extends in the circumferential direction, is determined in advance based on tests, simulations, or the like. The thickness is set so that the interlock cam 43 is separated from the shaft portion 42 (camshaft 24), for example, when receiving a load that is less than a first predetermined load strength and greater than a second predetermined load strength. In the illustrated example, the first load strength corresponds to a load that plastically twists and deforms the shaft portion 42 when rotation of the camshaft 24 is restricted by the key cylinder 7 that is located in the IG OFF position. The second load strength corresponds to a load that acts from the link 63 of the key interlock unit 9 on the interlock cam 43 when the driver uses the mechanical key 80 to rotate the key cylinder 7 to the IG OFF position with the shift lever 81 located at a position other than the parking position (refer to FIG. 7A).

In the illustrated example, the camshaft 24 may be manufactured, for example, by casting. The shaft portion 42 and the interlock cam 43 of the camshaft 24 may be formed in a single piece. In the illustrated example, the camshaft 24 including the interlock cam 43, the shaft portion 42, and the lock actuation cam 41 is a single piece. When manufacturing the interlock cam 43, the cutaway portion 74 is formed in each of the second walls 72, for example, by machining so that each of the second walls 72 has the shape described above.

The operation and advantages of the steering lock device 1 will now be described.

(1) The camshaft 24 is configured so that the interlock cam 43 is separated from the shaft portion 42 when the load exceeding the predetermined strength acts on the interlock cam 43 in the locked state. Thus, when a third party tampers with the steering lock device 1 by applying a load to the interlock cam 43 to rotate the camshaft 24, the interlock cam 43 is separated from the shaft portion 42 before rotation of the lock actuation cam 41 disengages the lock bar 22 from the steering shaft 4. Thus, the load cannot be applied to the interlock cam 43 to rotate the camshaft 24. This obviates unauthorized unlocking.

In the present embodiment, the key interlock unit 9 is formed from a synthetic resin. The key interlock unit 9 is attached to the housing 2. With this structure, there is a high probability that the key interlock unit 9 is tampered with from outside the key interlock unit 9 to expose the interlock cam 43 from the interlock attachment portion 14. However, the interlock cam 43 is configured to be separated from the shaft portion 42 when a large load acts on the interlock cam 43. This obviates the tampering attempted on the key interlock unit 9 from unauthorized unlocking. Thus, the resistance to tempering is improved.

(2) The camshaft 24 includes the shaft portion 42 and the interlock cam 43, which are formed integrally with each other. Additionally, the basal end of each of the second walls 72 includes the cutaway portion 74. This allows the interlock cam 43 to break from the cutaway portion 74 and separated from the shaft portion 42 when the load exceeding the predetermined strength acts on the interlock cam 43. Thus, the interlock cam 43 is configured to be separated from the shaft portion 42 without increasing the number of components.

(3) The case 61 and the link 63 of the key interlock unit 9 are formed from a synthetic resin. This reduces the weight of the steering lock device 1.

It should be apparent to those skilled in the art that the present invention may be embodied in many other specific forms without departing from the scope of the invention. Particularly, it should be understood that the present invention may be embodied in the following forms.

In the embodiment, the predetermined strength of a load that separates the interlock cam 43 from the shaft portion (minimum value of load needed to separate interlock cam 43 from shaft portion 42) is set to be less than the first load strength, which plastically twists and deforms the shaft portion 42. However, for example, when the camshaft 24 is designed so that the elongated hole 45 is plastically deformed before the plastically twisting and deformation of the shaft portion 42, the predetermined strength may be set to be less than the minimum load capable of plastically deforming the elongated hole 45. The predetermined strength only needs to be set so that the interlock cam 43 is separated before rotation of the lock actuation cam 41 disengages the lock bar 22 from the steering shaft 4. The predetermined strength may be changed taken into consideration the strength of other portions of the camshaft 24 and the strength of the key cylinder 7 coupled to the camshaft 24.

In the embodiment, the interlock cam 43 is configured to be separated from the camshaft 24. However, instead of or in addition to the interlock cam 43, the camshaft 24 may be configured so that, for example, the counterweight 44 is separated from the camshaft 24. Alternatively, when the camshaft 24 includes another projection radially projecting from the shaft portion 42 in addition to the lock actuation cam 41, the interlock cam 43, and the counterweight 44, the camshaft 24 may be configured to allow for separation of the projection. It is preferred that the projection configured to be separated from the camshaft 24 be accommodated in the housing 2 when the key cylinder 7, the ignition switch 8, and the key interlock unit 9 are coupled to the housing 2. However, the projection may be exposed from the housing 2. When the camshaft 24 includes one or more projections configure to be separated, the interlock cam 43 does not have to be configured to be separated from the shaft portion 42.

In the embodiment, the interlock cam 43 is formed integrally with the shaft portion 42. Instead, for example, when the interlock cam 43 and the shaft portion 42 are manufactured as separate members, the interlock cam 43 may be fixed to the shaft portion 42 by welding the interlock cam 43 and the shaft portion 42 or by using a projection and a recess to fit together the interlock cam 43 and the shaft portion 42.

In the embodiment, the interlock cam 43 includes the first to third walls 71 to 73. However, the shape of the interlock cam 43 may be changed. For example, the interlock cam 43 may be box-shaped.

In the embodiment, the basal end of each of the second walls 72 includes the cutaway portion 74, which functions as the low-strength portion that reduces the strength of the part connecting the interlock cam 43 and the shaft portion 42. However, the low-strength portion is not limited to the cutaway portion 74 and may be changed. For example, the basal end of the first wall 71 may include a cutaway portion functioning as the low-strength portion. Alternatively, for example, the basal end of the first wall 71 or the basal ends of the second walls 72 may include a number of small holes functioning as the low-strength portion.

The interlock cam 43 may be omitted from the camshaft 24. The key interlock unit 9 may be omitted from the steering lock device 1.

The solenoid 62 may be a different type of solenoid such as a pull solenoid.

The case 61 and the link 63 of the key interlock unit 9 may be formed from a material other than a synthetic resin. Even if the case 61 is not formed from a synthetic resin, when the key interlock unit 9 is configured to be separately attached to the housing 2, there is a high probability that a third party does not tamper with the housing 2 but tampers with the key interlock unit 9. The interlock cam 43 is configured to be separated from the shaft portion 42 when the load exceeding the predetermined strength acts on the interlock cam 43. Thus, the resistance to the tampering is improved.

In the embodiment, the shape of the housing 2 may be changed. For example, the interlock attachment portion 14 may be located closer to the opening 13. The key interlock unit 9 may be located closer to the key cylinder 7 than the lock mechanism 21.

In the embodiment, the structure of the lock mechanism 21 may be changed as long as the steering operation is restricted. For example, the lock stopper 23 may be omitted. In this case, the camshaft 24 may be configured to directly actuate the lock bar 22.

In the embodiment, the steering lock device 1 may be of a mechanically-driven type or an electrically-drive type.

The present disclosure includes the following implementation(s).

[Implementation 1] A steering lock device in which the predetermined strength is less than a first load strength, which plastically twists and deforms the shaft portion when rotation of the camshaft is restricted by movement of the key cylinder to the IG OFF position, and is greater than a second load strength, which acts on the interlock cam from the key interlock unit when one attempts to rotate the mechanical key to the IG OFF position in a state in which the shift lever 81 is not shifted to the parking position. This structure obtains the key interlock function. Also, with this structure, when a third party who is attempting unauthorized unlocking applies a load exceeding the predetermined strength to the interlock cam with a tool or the like, the interlock cam is separated. This obviates unauthorized unlocking.

The present examples and embodiments are to be considered as illustrative and not restrictive, and the invention is not to be limited to the details given herein, but may be modified within the scope and equivalence of the appended claims. For example, one or more of the components may be omitted from the components described in the embodiments (or one or more aspects thereof). Components in different embodiments may be appropriately combined.

The invention claimed is:

1. A steering lock device comprising:
   a camshaft including a shaft portion having an axis, a lock actuation cam that radially projects from a first position of the shaft portion in an axial direction, and a projection that radially projects from a second position of the shaft portion that differs from the first position in the axial direction, wherein the camshaft is rotated about the axis when a key cylinder is operated by a mechanical key;
   a housing that rotatably accommodates the camshaft; and
   a lock bar that is moved by the lock actuation cam in a locking direction or an unlocking direction when the camshaft is rotated, wherein
   when the lock bar is moved in the locking direction, the lock bar engages a steering shaft to lock the steering shaft,
   when the lock bar is moved in the unlocking direction, the lock bar is disengaged from the steering shaft to unlock the steering shaft, and
   when the lock bar locks the steering shaft, the camshaft is configured so that the projection is separated from the shaft portion if a load exceeding a predetermined strength acts on the projection of the camshaft, wherein the predetermined strength rotates the lock actuation cam to disengage the lock bar from the steering shaft.

2. The steering lock device according to claim 1, wherein the shaft portion and the projection of the camshaft are formed integrally with each other,
   the camshaft includes a low-strength portion located where the projection and the shaft portion are connected to each other.

3. The steering lock device according to claim 1, wherein the steering lock device is used with a vehicle shift lever that is shifted to a parking position and a non-parking position,
   the key cylinder is coupled to the housing,
   the housing includes an interlock attachment portion configured to attach a key interlock unit that prohibits removal of the mechanical key from the key cylinder unless the shift lever is shifted to the parking position, and
   the projection includes a cam-shaped interlock cam that actuates the key interlock unit.

4. The steering lock device according to claim 3, wherein the key interlock unit includes a synthetic resin case.

5. The steering lock device according to claim 1, wherein the camshaft includes a breakable portion that is locally narrow or thin,
   the breakable portion is located at or proximate to a boundary of the shaft portion and the projection, and
   when the camshaft receives a load exceeding the predetermined strength, the breakable portion is configured to break so that the projection is separated from the shaft portion but the lock actuation cam is not separated from the shaft portion.

* * * * *